United States Patent Office 2,826,557

Patented Mar. 11, 1958

2,826,557

MOLDING COMPOSITIONS COMPRISING DEXTRAN OR DERIVATIVE AND METHOD OF MOLDING

Elwood P. Wenzelberger, Dayton, Ohio, assignor to The Commonwealth Engineering Company of Ohio, Dayton, Ohio, a corporation of Ohio No Drawing. Application July 26, 1954
Serial No. 445,881

14 Claims. (Cl. 260—17.4)

This invention relates to new molding compositions. More particularly, the invention relates to molding compositions comprising a polymerizable polyester resin and dextran or benzyl dextran.

Polymerizable unsaturated polyesters have special value in the production of molded articles since such resins are fusible at temperatures sufficiently below the hardening temperature to permit forming the fused resin into the desired shape before hardening of the resin is initiated. The fabricating operation is, therefore, markedly simplified since neither the time nor temperature for the fabrication is as critical as is the case, for example, with certain other resins such as those of the urea- or phenol-formaldehyde type.

However, the polyester resins are relatively expensive and for that reason, and others, it is common practice to combine the polyester with a filler.

One of the objects of this invention is to provide new molding compositions comprising the combination of a polymerizable unsaturated polyester and a novel filler which is dextran or benzyl dextran.

In accordance with the invention the dextran or benzyl dextran, in particulate form, is milled with a resinous polymerizable unsaturated polyester, at a temperature below the hardening temperature for the polyester but at which a homogeneous mass is obtained, the impregnated filler is allowed to dry and then granulated in a suitable device to obtain a molding powder.

The dextran may be obtained in any suitable way but is usually biosynthesized from sucrose using microorganisms of the *Leuconostoc mesenteroides* or *L. dextranicum* types, or their enzymes. Microorganisms which may be used include those bearing the following NRRL (Northern Regional Research Laboratory) designations: *Leuconostoc mesenteroides* B–512, B–119, B–1146, B–1190, B–742, B–1191, B–1196, B–1208, B–1216, B–1120, B–1144, B–523; *Streptobacterium dextranicum* B–1254 and *Betabacterium vermiforme* B–1139.

A culture of the microorganism, or the enzyme filtered therefrom, is introduced into an aqueous sucrose-bearing nutrient medium and the mass is incubated until the dextran is produced in maximum yield, after which it is precipitated from the fermentate by means of a water-miscible aliphatic alcohol or ketone. The "native" dextran thus obtained is normally characterized by a very high molecular weight which has been calculated to be in the millions. It may be, and preferably is, used in conjunction with the polyester resin after purification and reduction to particulate condition. Although it is preferred to use the microbiologically produced native dextran of very high molecular weight as the filler component of the new molding compositions, dextran of lower molecular weight may be used, such as a native dextran microbiologically produced under special controlled conditions resulting in an initial dextran of comparatively low molecular weight or a dextran obtained by partial hydrolysis of the native very high molecular weight dextran. In general, the dextran may have a molecular weight in the range 5000 to $150\times10^6$, determined by light scattering measurements. However, water-insoluble or substantially water-insoluble native high molecular weight dextran, such as *L. m.* B–523 dextran is preferred.

If benzyl dextran is used as the filler it may be prepared by reacting dextran with benzyl chloride according to known methods and is preferably a highly substituted ether, i. e., one containing an average of 2.0 to 3.0 benzyl groups per anhydroglucopyranosidic unit of the dextran.

The resinous unsaturated polyester mixed with the dextran or benzyl dextran is a polymerizable unsaturated polyhydric alcohol-polycarboxylic acid polyester prepared by reaction of one or more polyhydric alcohols and one or more polybasic acids.

The proportion of polyhydric alcohol containing more than two hydroxyl groups, such as glycerol or pentaerythritol, and the proportion of polycarboxylic acids containing more than two carboxyl groups, such as citric acid, is preferably small to insure that in the production of the polyester there may be maximum esterification of the hydroxyl and carboxyl groups without excessive viscosity. Usually, it is desirable for the unsaturated polyester to be polymerizable into an infusible or high-melting and high-softening point resin and, therefore, the proportion of unsaturated components is such that the polyester contains an average of more than one double bond per molecule; for instance, there may be an average of eleven or more double bonds in every ten molecules of the polyester.

Any polymerizable unsaturated polyhydric alcohol-polycarboxylic acid polyester may be mixed with the dextran or benzyl dextran. Typical of such polyesters is the product resulting from the reaction of an unsaturated dicarboxylic acid such as maleic, fumaric, itaconic, citraconic or mesaconic acid with a dihydric alcohol such as any polymethylene glycol in the series from ethylene glycol to decamethylene glycol, propylene glycol, any butylene glycol, any polyethylene glycol in the series from diethylene glycol to nona-ethylene glycol, dipropylene glycol, any glycerol monobasic acid monoester (alpha or beta position) such as monoformin or monoacetin, any mono-ether of glycerol with a monohydric alcohol such as mono-methylin or mono-ethylin, or any dihydroxyalkane in which the hydroxy radicals are attached to carbon atoms that are primary, secondary or both, in the series from dihydroxy butane to dihydroxy decane.

A portion of the unsaturated dicarboxylic acid may be replaced by a saturated dicarboxylic acid, such as any normal acid in the series from oxalic acid and malonic acid to sebacic acid, or any benzene dicarboxylic, naphthalene dicarboxylic or cyclohexane dicarboxylic acid, or diglycolic, dilactic or resorcinol diacetic acid. All of the unsaturated acid may be replaced by a saturated acid if a polyhydric alcohol is present the molecule of which contains two or three free hydroxyl groups and consists of an ether of one or two molecules of allyl or methallyl alcohol with one molecule of a polyhydroxy compound such as glycerol, pentaglycerol, pentaerythritol, butanetetrol-1,2,3,4, a trihydroxy normal alkane having from four to five atoms such as butantriol-1,2,3 or a monoalkyl ether of pentaerythritol or butanetetrol-1,2,3,4 in which the alkyl radical contains from one to four carbon atoms and has from one to two hydrogen atoms attached to the same carbon atom as the ether linkage, such as the monomethyl or mono-isobutyl ether of pentaerythritol.

In preparing the polymerizable unsaturated polyester, any of the usual modifiers such as monobasic acids, monohydric alcohols and natural resin acids may be added.

The larger the proportions of monobasic acids and monohydric alcohols, the lower is the average number of acid and alcohol resides in the resulting polyester molecules and the lower is the viscosity of the polyester. Conversely, the more nearly equal the molecular proportions of dibasic acid and dihydric alcohol, the larger is the average number of residues in the resulting polyester molecule and the higher is the viscosity of the polyester. The proportions of the reactants are selected to yield a resinous polyester having a viscosity such that it is readily mixed with the particulate dextran or benzyl dextran.

The reaction is allowed to proceed at a temperature high enough and for a time long enough to obtain a polyester having a viscosity such that the resinous liquid can be conveniently milled with the filler, but the temperature and reaction time are controlled so that the resinous product is only a partial polymerizate. A catalyst may be included to expedite the reaction. Any organic or inorganic acid or acid salt soluble in the reaction mixture may be used as catalyst but should be readily volatile or of such character that it does not harmfully influence the polyester.

An inhibiting agent for controlling and limiting the degree of polymerization may be added. Any suitable anti-oxidant may be used as the inhibitor, such as hydroquinone, pyrogallol, tannic acid or an aromatic amine of the type of aniline or phenylene diamine. The polymerizable unsaturated polyester is preferably produced in an atmosphere of an inert gas such as carbon dioxide, nitrogen or the like, to prevent darkening and permit production of a pale or colorless product. The inert gas may be bubbled through the reacting ingredients, that method also serving to agitate the mass and expedite removal of water formed as by-product of the reaction. The exclusion of oxygen is desirable for avoiling discoloration of the polyester and also because oxygen tends to produce premature polymerization.

The acid number of the polyester is dependent on the extent of reaction and the proportions of acid and alcohol used. Using equimolecular proportions of dibasic acid and dihydric alcohol, the reaction may be carried to an acid number of about 20.

The following is an example of the preparation of a polyester to be combined with the dextran or benzyl dextran.

A. A three-necked flask is employed in which 5.4 mols of diethylene glycol are mixed together. The flask is then fitted with a thermometer, a tube leading to a condenser and an inlet tube through which a stream of carbon dioxide is introduced, and is lowered into an oil bath at a temperature of 210° C. The distillate may be analyzed during the reaction and a sufficient amount of the ingredient lost in excess may be added to the flask periodically to maintain the initial relative proportions of the reactants. After 8 hours the polyester obtained is a resinous, somewhat stiff liquid of acid number 18.

B. A resinous polyester may be prepared as in A, using 2.0 mols of maleic anhydride and 2.1 mols of diethylene glycol; the reaction is carried out for 4½ hours to obtain a polyester of acid number 14.

C. A polyester for the present purposes may be prepared as in A, using 3.0 mols of maleic anhydride and 3.3 mols of diethylene glycol, an amount of hydroquinone equal to 0.09% of the anhydride and glycol and an amount of p-toluene sulfonic acid equal to 0.18% of the combined anhydride and glycol weights.

D. The procedure of A may be repeated using 6.0 mols of maleic anhydride and 6 mols of ethylene glycol, the reactants being kept in an oil bath at 220° C. for 5½ hours, to obtain a resinous polyester of acid number 53.

E. The procedure of D may be repeated, using 5 mols of fumaric acid and 5 mols of diethylene glycol, the reaction being continued for 8¼ hours, to obtain a polyester of acid number 23.

In general, the polyester is prepared by methods known in the art.

The polyester may be mixed with the dextran or benzyl dextran in the form of a solution containing, in addition to the polyester, one or more polymerizable monomeric compounds. The unsaturated polyester, the monomeric compound, or both may be partially polymerized before the ingredients are mixed. Polymerizable monomeric compounds useful in the preparation of such a solution include diallyl phthalate, diallyl oxalate, diallyl diglycolate, triallyl citrate, carbonyl bis-(allyl lactate), maleyl bis-(allyl lactate), fumaryl bis-(allyl lactate), succinyl bis-(allyl lactate), phthalyl bis-(allyl lactate), fumaryl bis-(allyl glycolate), carbonyl bis-(allyl glycolate), carbonyl bis-(allyl salicylate), tetra-(allyl glycolate) silicate, and tetra-(allyl lactate) silicate. The solutions may contain 20 to 30% of the polymerizable monomeric compound and 70 to 80% of the polymerizable polyester.

Blends of the polyesters with other monomeric polymerizable substances may also be mixed with the new fillers, including blends thereof with 5% to 50% by weight of the blend of styrene and vinyl-substituted tertiary heterocyclic amines such as the vinylpyridines, vinyl acetate, methylmethacrylate or methyl acrylate.

Admixture of the particulate dextran or benzyl dextran with the polyester or blend or solution containing it may be carried out by any convenient method. If the polyester is quite viscous, it may be more convenient to mix it with the dextran or benzyl dextran on a heated two-roll (differertial speed) rubber mill or to heat the polyester to reduce the viscosity thereof sufficiently to permit use of other mixing procedures.

The proportion of dextran or benzyl dextran in the molding composition may range from as low an amount as 1% by weight to a very high proportion such as about 80%. In general, the preferred compositions comprise about 40 to 75% of dextran or benzyl dextran in the molding composition. In casting and adhesive compositions, small amounts of the dextran or benzyl dextran are used, such as 1% to 5%, or an amount which does not impart undue stiffness to the mix.

A curing catalyst is incorporated in the polyester before it is mixed with the dextran or benzyl dextran. The preferred catalyst is benzoyl peroxide, but other organic peroxides may be used, such as succinyl peroxide, acetyl peroxide, peracetic acid, perbenzoic acid, toluyl peroxide, p-brombenzoyl peroxide, anisoyl peroxide, chloracetyl peroxide or furoyl peroxide, or any organic ozonide such as di-isopropylene ozonide di-isobutylene ozonide, or mixtures thereof.

The curing catalyst is used in the minimum amount to cause polymerization of the composition at the desired rate, and the amount varies with the catalyst used.

The following examples are illustrative of specific embodiments of the invention, it being understood that these examples are not intended as limitative.

*Example I*

Fifty parts of particulate B–523 native unhydrolyzed dextran, 25 parts of a solution of a polymerizable polyester prepared as hereinbefore described (from a charge consisting of 1.05 mols of monoethylene glycol, 1.0 mol of maleic anhydride and an amount of hydroquinone equal to 0.04% of the charge, the charge being heated to 220° C. over a period of two hours and held at 220° C. to 226° C. for an additional six hours, and the resulting polyester of acid number about 35 being cooled to 145–150° F. and mixed with 5 parts of diallyl phthalate and a paste of 1.5 parts of benzoyl peroxide and 1.5 parts of tricresyl phosphate to form the solution) and an amount of zinc stearate equal to 2.0% by weight of the composition, are milled for 10–12 minutes on a heated 2-roll (differential speed) rubber mill at about 45° C. The resulting mixture is removed in sheets, allowed to completely solidify at about 80° F. to 90° F. and then granulated in a high speed cutter to a maximum particle diameter of ⅛-inch. This granulated molding composition may be compression molded at a temperature equivalent to 65 to 70 pounds' gauge pressure of steam for 1 to 5 minutes. It is fast curing and results in molded articles of good strength.

*Example II*

The procedure of Example I is repeated using *L. m.* B–512 native unhydrolyzed dextran.

*Example III*

The procedure of Example I is carried out, using *L. m.* B–512 dextran having a molecular weight of 20,000 to 200,000.

*Example IV*

The procedure of Example I is repeated, except that the filler is benzyl dextran derived from *L. m.* B–512 native unhydrolyzed dextran containing an average of 2.8 benzyl groups per anhydroglucopyranosidic unit.

*Example V*

A polymerizable polyester is prepared as described and, after the partial reaction, about 10 parts by weight of 2-vinylpyridine is incorporated in the resinous liquid, which is then further modified by inclusion of the benzoyl peroxide curing catalyst and zinc stearate as mold lubricant. The milled sheets are reduced to powdered condition to obtain a free flowing powder suitable for compression molding. During the molding the 2-vinylpyridine apparently reacts with the polyester to form cross-links between chains thereof.

Instead of 2-vinylpyridine, nuclearly alkyl-substituted vinylpyridines may be mixed with the liquid resinous polyester, such as 2-vinyl-5-ethyl-or 5-methyl pyridine, 2-ethyl-or 2-methyl-5-vinylpyridine, and so on.

In the molded articles, the polymerized polyester serves as a thermoset binder for the dextran or benzyl dextran.

Various changes and modifications may be made in details in practicing the invention and since such variations may be made within the spirit and scope of the disclosure, it is to be understood that it is not intended to limit the invention except as defined in the appended claims.

What is claimed is:

1. A molding composition comprising from 1% to 80% by weight of a particulate filler selected from the group consisting of dextran and benzyl dextran and a blend of a polymerizable olefinically unsaturated polyhydric alcohol-polycarboxylic acid polyester with from 5% to 50% by weight of a polymerizable olefinically unsaturated monomeric compound compatible with the polyester, and selected from the group consisting of styrene and vinyl-substituted tertiary heterocyclic amines.

2. A molding composition comprising from 1% to 80% by weight of particulate dextran and a blend of a polymerizable olefinically unsaturated polyhydric alcohol-polycarboxylic acid polyester with from 5% to 50% by weight of a polymerizable olefinically unsaturated monomeric compound compatible with the polyester, and selected from the group consisting of styrene and vinyl-substituted tertiary heterocyclic amines.

3. A molding composition comprising from 1% to 80% by weight of particulate benzyl dextran and a blend of a polymerizable, olefinically unsaturated polyhydric alcohol-polycarboxylic acid polyester with from 5% to 50% by weight of a polymerizable olefinically unsaturated monomeric compound compatible with the polyester, and selected from the group consisting of styrene and vinyl-substituted tertiary heterocyclic amines.

4. A molding composition comprising from 1% to 80% by weight of a particulate filler selected from the group consisting of dextran and benzyl dextran and a blend of a polymerizable olefinically unsaturated polyhydric alcohol-polycarboxylic acid polyester with from 5% to 50% by weight of a vinylpyridine.

5. A molding composition comprising from 1% to 80% by weight of particulate dextran and a blend of a polymerizable olefinically unsaturated polyhydric alcohol-polycarboxylic acid polyester with from 5% to 50% by weight of 2-vinylpyridine.

6. A molding composition comprising from 1% to 80% by weight of particulate benzyl dextran and a blend of a polymerizable olefinically unsaturated polyhydric-alcohol-polycarboxylic acid polyester with from 5% to 50% by weight of 2-vinylpyridine.

7. A molding composition comprising from 1% to 80% by weight of a particulate filler selected from the group consisting of dextran and benzyl dextran and a blend of a polymerizable olefinically unsaturated polyhydric alcohol-polycarboxylic acid polyester with from 5% to 50% by weight of 2-vinyl-5-ethylpyridine.

8. A molding composition comprising from 1% to 80% by weight of particulate dextran and a blend of a polymerizable olefinically unsaturated polyhydric alcohol-polycarboxylic acid polyester with from 5% to 50% by weight of 2-vinyl-5-ethylpyridine.

9. A molding composition comprising from 1% to 80% by weight of particulate benzyl dextran and a blend of a polymerizable olefinically unsaturated polyhydric alcohol-polycarboxylic acid polyester with from 5% to 50% by weight of 2-vinyl-5-ethylpyridine.

10. A molding composition comprising from 1% to 80% by weight of a particulate filler selected from the group consisting of dextran and benzyl dextran and a blend of a polymerizable olefinically unsaturated polyhydric alcohol-polycarboxylic acid polyester with from 5% to 50% by weight of 2-ethyl-5-vinylpyridine.

11. A molding composition comprising from 1% to 80% by weight of particulate dextran and a blend of a polymerizable olefinically unsaturated polyhydric alcohol-polycarboxylic acid polyester with from 5% to 50% by weight of 2-ethyl-5-vinylpyridine.

12. A molding composition comprising from 1% to 80% by weight of particulate benzyl dextran and a blend of a polymerizable olefinically unsaturated polyhydric alcohol-polycarboxylic acid polyester with from 5% to 50% by weight of 2-ethyl-5-vinylpyridine.

13. A process which comprises incorporating from 1% to 80% by weight of particulate dextran in a resinous mass comprising a blend of a polymerizable, olefinically unsaturated, polyhydric alcohol-polycarboxylic acid polyester with from 5% to 50% by weight of a polymerizable, olefinically unsaturated monomeric compound compatible with the polyester and selected from the group consisting of styrene and vinyl-substituted tertiary heterocyclic amines, and a heat-curing catalyst, and molding and heat-curing the resulting composition.

14. A process which comprises incorporating from 1% to 80% by weight of particulate benzyl dextran in a resinous mass comprising a blend of a polymerizable, olefinically unsaturated, polyhydric alcohol-polycarboxylic acid polyester with from 5% to 50% by weight of a polymerizable, olefinically unsaturated monomeric compound compatible with the polyester and selected from the group consisting of styrene and vinyl-substituted tertiary heterocyclic amines, and a heat-curing catalyst, and molding and heat-curing the resulting composition.

References Cited in the file of this patent

UNITED STATES PATENTS

| | | |
|---|---|---|
| 2,308,495 | D'Alelio | Jan. 19, 1943 |
| 2,600,457 | Wynstra | June 17, 1952 |
| 2,624,768 | Toulmin | Jan. 6, 1953 |
| 2,673,151 | Gearhart | Mar. 23, 1954 |

OTHER REFERENCES

"Advances in Carbohydrate Chemistry," volume 4, page 333, published by Academic Press, Inc., 1949.